(12) United States Patent
Gustafson

(10) Patent No.: US 8,369,493 B2
(45) Date of Patent: Feb. 5, 2013

(54) SYSTEM AND METHOD FOR RECORDING AN AUDIO TO-DO LIST AND ADDING TO-DO LIST ITEMS TO A CALENDAR APPLICATION

(75) Inventor: Pamela K. Gustafson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 904 days.

(21) Appl. No.: 12/164,884

(22) Filed: Jun. 30, 2008

(65) Prior Publication Data

US 2009/0323908 A1    Dec. 31, 2009

(51) Int. Cl.
*H04M 1/64* (2006.01)

(52) U.S. Cl. ............ 379/88.12; 379/88.04; 379/265.05; 705/7.21; 455/412.2

(58) Field of Classification Search ............... 379/88.13, 379/88.14, 210.01, 48, 72, 76, 88.04, 88.12, 379/100.06, 144.07, 167.08, 265.05; 455/456.1, 455/557, 412.2; 705/7.18, 7.21, 7.24; 707/912, 707/916, 917; 719/318; 704/235
See application file for complete search history.

(56) References Cited

U.S. PATENT DOCUMENTS

| | | | |
|---|---|---|---|
| 6,546,262 B1 * | 4/2003 | Freadman | 455/557 |
| 6,775,360 B2 * | 8/2004 | Davidson et al. | 379/88.14 |
| 7,302,048 B2 | 11/2007 | Evans et al. | |
| 7,630,721 B2 * | 12/2009 | Ortiz | 455/456.1 |
| 8,146,104 B2 * | 3/2012 | Chakra et al. | 719/318 |
| 2009/0210225 A1 * | 8/2009 | Simpson et al. | 704/235 |

OTHER PUBLICATIONS

"Jott for Outlook", date of webpage Sep. 18, 2008, 2 pgs., Copyright 2007 Jott Networks Inc.
"SpinVox—How Does It work", date of webpage Sep. 18, 2008, 3 pgs., Spinvox.com.
"reQall—Where Can I Use reQall?—Phone", date of webpage Sep. 18, 2008, 4 pgs., Copyright 2008, QTech, Inc.
"reQall—Where Can I Use reQall?—Calendar Integration", date of webpage Sep. 18, 2008, 2 pgs., Copyright 2008, QTech, Inc.
"reQall—The Best Way to Remember What's Important to You", date of webpage Sep. 11, 2008, 6 pgs., Copyright 2008, QTech, Inc.
"Jott—Captur Thoughts, reate To=Dos and Set Reminders with a Simple Phone Call", date of webpage Sep. 11, 2008, 1 pg., Copyright 2007 Jott Networks Inc.
"Memo through SpinVox", date of webpage Sep. 11, 2008, 4 pgs., Spinvox.com.

* cited by examiner

*Primary Examiner* — Md S Elahee
(74) *Attorney, Agent, or Firm* — Swanson & Bratschun, L.L.C.

(57) ABSTRACT

An embodiment of a method for recording a to-do list includes receiving an incoming call by a first communication device from a caller using a second communication device. In at least one embodiment, the first communication device is located at a customer premise location. The method further includes prompting the caller to record an audio to-do list, recording an audio to-do list from the caller, and converting the audio to-do list into a text to-do list. The method further includes converting the text to-do list into at least one to-do list item, and sending the at least one to-do list item to a computing device to be utilized by an application. In at least one embodiment, the method further includes adding the at least one to-do list item to a software calendar application associated with the computing device.

18 Claims, 6 Drawing Sheets

| Calendar | 406a [Daily] | 406b [Weekly] | 406c [Monthly] | | | | |
|---|---|---|---|---|---|---|---|
| | Sunday June 1 | Monday June 2 | Tuesday June 3 | Wednesday June 4 | Thursday June 5 | Friday June 6 | Saturday June 7 |
| 8am | | pick up laundry ✱ 411 / 410 | | | | | |
| 9am | | | | | | | |
| 10am | | | | file report — 414 | | | |
| 11am | | | | | | | |
| 12pm | | | | | | | |
| 1pm | | | | | | | |
| 2pm | | | Call John — 408 | | | | |
| 3pm | | | | | teleconference 412 | | |
| 4pm | | | | | | | attend birthday party 416 |
| 5pm | | | | | | | |
| 6pm | | | | | | | |

FIG. 4

SYSTEM AND METHOD FOR RECORDING AN AUDIO TO-DO LIST AND ADDING TO-DO LIST ITEMS TO A CALENDAR APPLICATION

BACKGROUND

Voicemail systems allow a caller to leave a voicemail for a user if the user is not available to answer a call from the caller. If the user does not answer an incoming call from a caller, the voicemail system provides a pre-recorded greeting to the caller, and prompts the caller to leave an incoming message for the user. Sometimes, the user may wish to call his or her own voicemail system in order to leave reminders that the user intends to listen to later. For example, the user may call his or her voicemail system and leave a voicemail message that includes a to-do list of tasks of which the user wishes to be reminded. Once the user returns home, he or she may listen to the voicemail message and transcribe the to-do list to a paper format.

SUMMARY

Embodiments of the invention allow a user to call a voicemail system and record an audio to-do list. The audio to-do list may be converted into a text to-do list, and the text to-do list is converted into individual to-do list items. In at least one embodiment, the individual to-do list items are added to a software calendar application being executed by a computing device. In some embodiments, the user can choose to have the text to-do list printed by a printing device to produce a hard-copy of the to-do list.

An embodiment of a method for recording a to-do list includes receiving an incoming call by a first communication device from a caller using a second communication device. In at least one embodiment, the first communication device is located at a customer premise location. The method further includes prompting the caller to record an audio to-do list, recording an audio to-do list from the caller, and converting the audio to-do list into a text to-do list. The method further includes converting the text to-do list into at least one to-do list item, and sending the at least one to-do list item to a computing device to be utilized by an application. In at least one embodiment, the method further includes adding the at least one to-do list item to a software calendar application associated with the computing device.

An embodiment of an apparatus for recording a to-do list includes at least one processor configured to receive an incoming call by a first communication device from a caller using a second communication device. In at least one embodiment, the first communication device is located at a customer premise location. The at least one processor is further configured to prompt the caller to record an audio to-do list, record an audio to-do list from the caller, and convert the audio to-do list into a text to-do list. The at least one processor is further configured to convert the text to-do list into at least one to-do list item, and send the at least one to-do list item to a computing device to be utilized by an application. In at least one embodiment, the at least one processor is further configured to add the at least one to-do list item to a software calendar application associated with the computing device.

BRIEF DESCRIPTION OF THE DRAWINGS

Illustrative embodiments of the present invention are described in detail below with reference to the attached drawing figures, which are incorporated by reference herein and wherein:

FIG. 4 is an embodiment of a graphical user interface (GUI) for displaying and modifying to-do list items associated with a software calendar application.

DETAILED DESCRIPTION OF THE INVENTION

Figure 1:
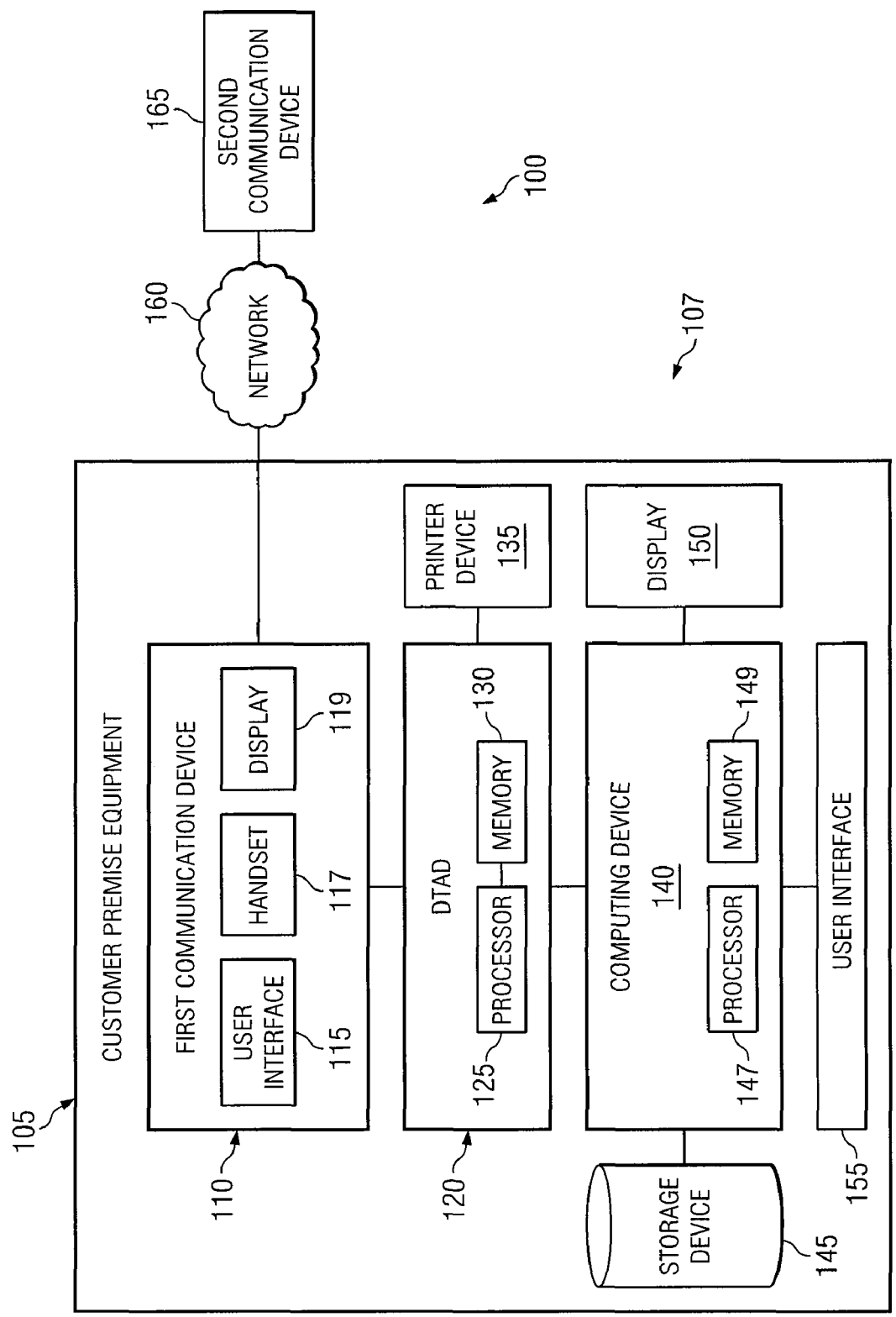
FIG. 1 is an embodiment of a system for recording a to-do list and adding to-do list items to a software calendar application.

FIG. 1 is an embodiment of a system 100 for recording a to-do list and adding to-do list items to a software calendar application. The system 100 includes customer premise equipment (CPE) 105 located at a user's home. In another embodiment, the CPE 105 is located at the user's office. The CPE 105 includes a first communication device 110 configured to allow the user to initiate, receive, and participate in communications sessions, such as telephone calls with other communications devices in communication with one or more communication networks. In at least one embodiment, the first communication device 110 is a telephone. The first communication device 110 includes a user interface 115. In at least one embodiment, the user interface 115 is a keypad. In at least one embodiment, the first communication device 110 further includes a handset 117, including a microphone and a speaker and/or earpiece. In some embodiments, the first communication device 110 further includes a display 119, such as a liquid crystal display (LCD). The display 119 is configured to display information, such as caller identification associated with an incoming caller or information related to a recorded voicemail or to-do list.

The CPE 105 further includes a digital telephone answering device (DTAD) 120 in communication with the first communication device 110. The DTAD 120 includes a processor 125 and memory 130. The memory 130 is configured to store computer instructions operable to cause the processor 125 to perform the various functions of the DTAD 120 described herein. In at least one embodiment, the memory 130 is configured to store at least one audio to-do list recorded by a caller to the first communication device 110. In some embodiments, the memory 130 is further configured to store incoming voicemails from callers. In at least one embodiment, the first communication device 110 and the DTAD 120 are integrated into a single device at a customer premise location 107. In another embodiment, the first communication device 110 and the DTAD 120 are configured as separate devices that are connected together at the customer premise location 107. The CPE 105 further includes a printer device 135 in communication with the DTAD 120. In at least one embodiment, the printer device 135 is operable to print a to-do list stored in the memory 130 of the DTAD 120. In at least one embodiment, the DTAD 120 and the printer device 135 are integrated into a single device at the customer premise location 107. In another embodiment, the DTAD 120 and the printer device are configured as separate devices that are connected together at the customer premise location 107. In at least one embodiment, the computing device 140 is a personal computer (PC). The CPE 105 further includes a computing device 140 in communication with the DTAD 120.

The computing device 140 includes a processor 147 and a memory 149. The memory 149 is configured to store computer instructions configured to cause the processor 147 to perform the various functions of the computing device 140 described herein. A storage device 145, a display 150, and a user interface 155 are further coupled to the computing device 140. The storage device is configured to store software applications executable by the computing device 140 and their associated data. In at least one embodiment, the storage device 145 stores a software calendar application and data managed thereby configured to manage a user's tasks and provide reminders for performing the tasks. In a particular embodiment, the software calendar application is Microsoft Outlook®. The display 150 is configured to display a graphical user interface (GUI) for the software calendar application. The user interface 115 is configured to allow a user to interface with the computing device 140. In at least one embodiment, the user interface 115 includes a keyboard and/or mouse.

The first communication device 110 is in further communication with a network 160. In at least one embodiment, the network 160 is a telephone network. The network 160 is in still further communication with a second communication device 165. The second communication device 165 may be configured to allow a caller to initiate and participate in communication sessions, such as telephone calls with the first communication device 110. In various embodiments, a user of the second communication device 165 may initiate a call to the first communication device 110 and record a to-do list using the DTAD 120. In at least one embodiment, the second communication device 165 is a telephone. And in still another embodiment, the second communication device 140 is a mobile handset. In at least one embodiment, the second communication device 165 is associated with a user of the CPE 105.

In an example operation of the system 100, a caller using the second communication device 165 places a call to the first communication device 110. The caller using the second communication device 165 enters a passcode, is prompted to record a to-do list, and then records an audio to-do list in the memory 130 of the DTAD 120. In an example embodiment, the caller records the audio to-do list by speaking one or more to-do list items into a handset of the second communication device 165. The caller may then select to have the audio to-do list converted into a text to-do list by the DTAD 120. The DTAD 120 may then sends the text to-do list to the printer device 135 for printing of a hardcopy of the text to-do list. In some embodiments, the caller may select to have the audio to-do list converted by the DTAD 120 into a text to-do list. The DTAD 120 may convert the text to-do list into individual to-do list items and sends the to-do list items to the computing device 140. The to-do list items include individual tasks for which the caller wishes to be reminded (e.g., "pick up milk"). In various embodiments, each to-do list item includes information related to one or more of a date (or day of the week), time, and description of an individual task. The computing device 140 may then add the to-do list items to a software calendar application stored on the storage device 145. At a later time, a user of the computing device 140 may display the to-do list items using the calendar application via a GUI in the display 150. The GUI of the display 150 may display the individual to-do list items in respective dates and/or times on the calendar application.

In an alternative embodiment, the conversion of the audio to-do list to a text to-do list, and the conversion of the text to-do list into to-do list items may be performed by the computing device 140 after the DTAD 120 sends the audio to-do list to the computing device 140. In various embodiments, the user of the computing device 140 may modify the to-do list items via the GUI of the software calendar application to change or correct the dates, times, and/or descriptions of one or more of the to-do list items. In still another embodiment, the conversion of the audio to-do list into a text to-do list, the conversion of the text to-do list into to-do list items, and the addition of the to-do list items into the software calendar application are performed automatically after the recording of the audio to-do list without requiring selection by the user. In still another embodiment, the user of the first communication device 110 may view the text to-do list using the display 119 of the first communication device 110.

Figure 2A:
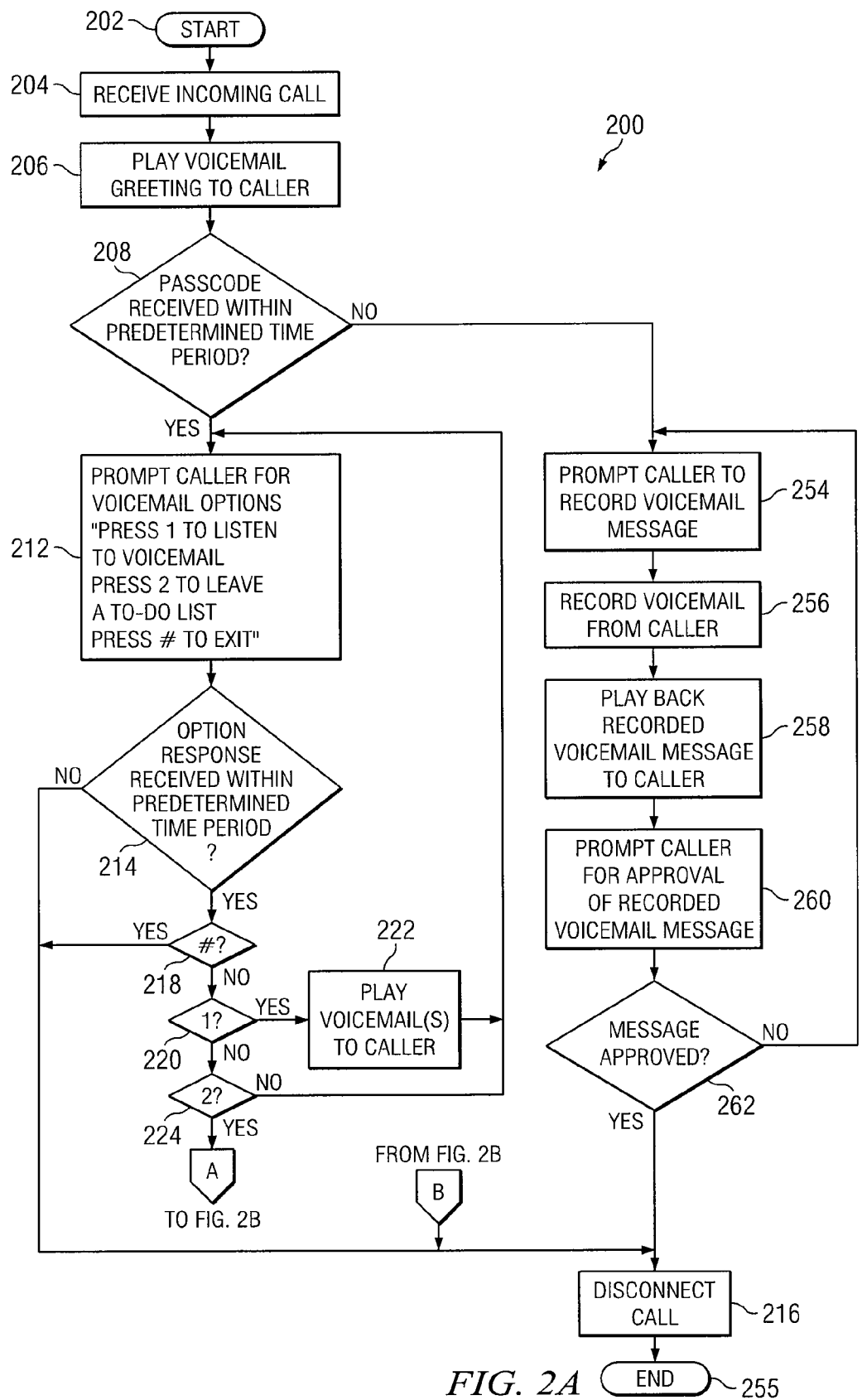
FIGS. 2A-2B illustrate an embodiment of a procedure for recording a to-do list and adding to-do list items to a software calendar application.
Figure 2B:
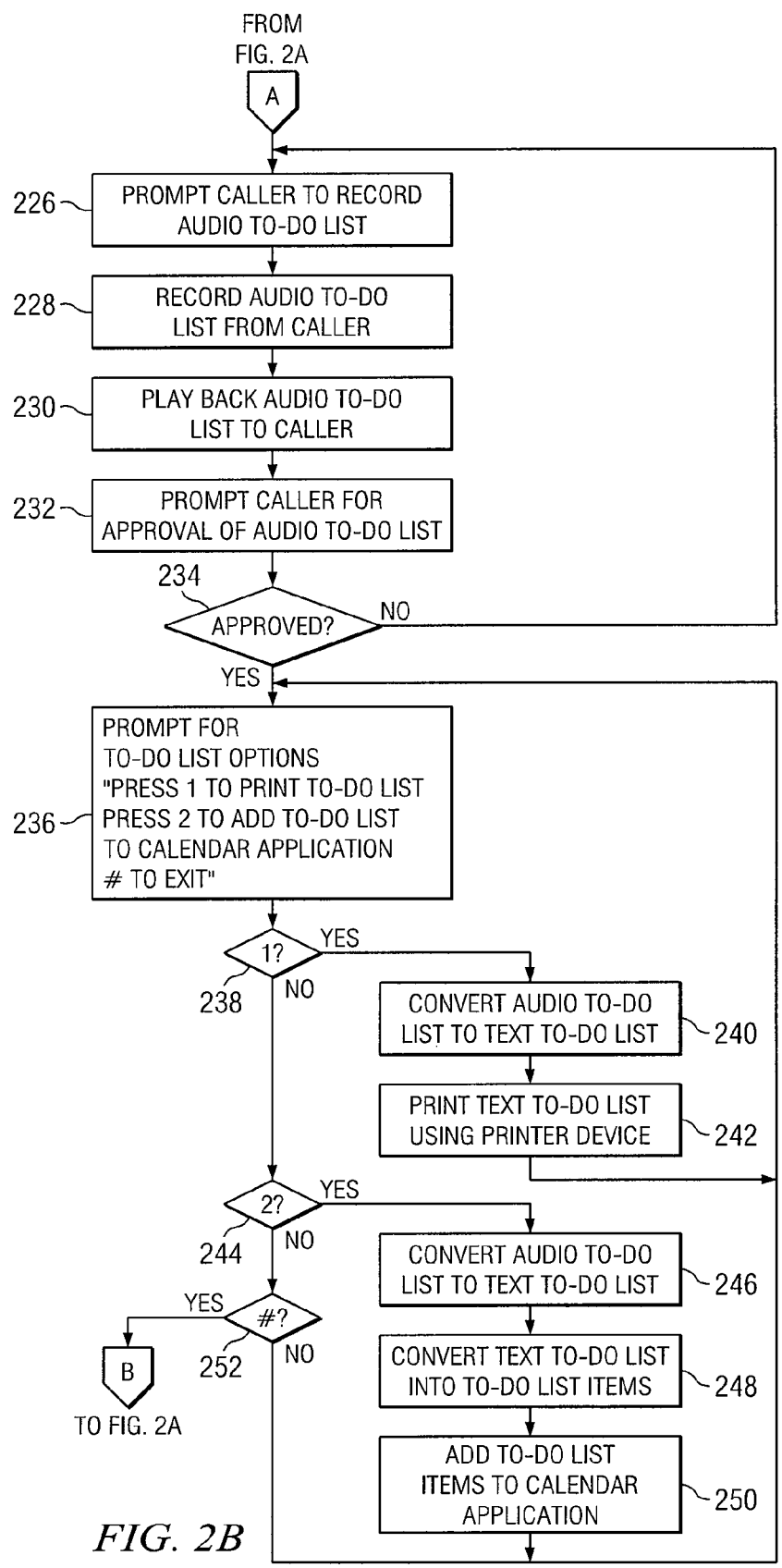

FIGS. 2A-2B illustrate an embodiment of a procedure 200 for recording a to-do list and adding to-do list items to a software calendar application. The procedure 200 begins at step 202. In step 204, the first communication device 110 receives an incoming call from a caller using the second communication device 165. In step 206, the DTAD 120 plays a voicemail greeting to the caller. In step 208, it is determined if the caller has entered a predetermined passcode using a keypad of the second communication device 165 within a predetermined time period after the initiation of the playing of the voicemail greeting. In at least one embodiment, the predetermined passcode is chosen by the user of the first communication 110. In an example embodiment, the caller enters *{passcode numbers} to enter the predetermined passcode, whereby the {passcode numbers} represent a sequence of four numbers chosen by the user of the first communication device 110 to represent the passcode. In at least one embodiment, the predetermined time period is the length of the voicemail greeting. If the predetermined passcode is received within the predetermined time period, the procedure continues to step 212. In step 212, the DTAD 120 prompts the caller to enter or select a voicemail option from a number of voicemail options available to the user. In at least one embodiment, the user is presented with an audible prompt describing available voicemail options. In an example embodiment, the caller is prompted to "press '1' to listen to voicemail", "press '2' to leave a to-do list," or "press '#' to exit." In step 214, it is determined if the caller has entered a voicemail option within a predetermined time period. If the caller has not entered a voicemail option within a predetermined time period, the procedure 200 continues to step 216. In step 216, the call is disconnected and the procedure 200 ends at step 255.

If in step 214, it is determined that the caller entered an option within the predetermined time period, the procedure continues to step 218. In step 218, it is determined if the caller has entered the "#" exit option. If the caller has entered the # exit option, the procedure continues to step 216 in which the call is disconnected and the procedure 200 ends at step 255. If in step 218 it is determined that the caller has not entered the "#" exit option, the procedure 200 continues to step 220. In step 220, it is determined if the caller has pressed the "1" key for voicemails option. If the caller has pressed the "1" voicemails option, the procedure continues to step 222 in which any voicemails for the caller stored in the memory 130 of the DTAD 120 are played back to the caller and the procedure returns to step 212. If in step 220, the caller did not press the "1" key for voicemails option, the procedure continues to step 224. In step 224, it is determined whether the caller has pressed the "2" key for the to-do list option. If the caller has not pressed the "2" key for the to-do list option, the procedure returns to step 212. If the caller has pressed the "2" key for the to-do list option, the procedure continues to step 226. In step 226, the caller is prompted to record an audio to-do list. In at least one embodiment, the caller is presented with an audible prompt to record the to-do list. In step 228, the audio to-do list is recorded from the caller and stored in the memory 130 of the DTAD 120. In step 230, the audio to-do list is played back to the caller.

In step 232, the caller is prompted for approval of the audio to-do list. In an example embodiment of the invention, the caller is prompted to press the "1" key to approve the audio to-do list recorded by the caller and to press the "#" key if the caller does not approve of the audio to-do list. In step 234, it is determined whether the caller has approved the to-do list. If the caller has not approved the to-do list, the procedure returns to step 226 in which the caller is prompted to re-record the audio to-do list. In at least one embodiment, the caller is audibly prompted to record the audio to-do list. If in step 234, the caller has approved the to-do list, the procedure continues to step 236. In step 236, the caller is prompted for to-do list options. In the illustrated embodiment of FIGS. 2A and 2B, the caller is prompted to press the "1" key to print the to-do list, to press the "2" key to add the to-do list contents as to-do list items to the software calendar application, and press the "#" key to exit. In step 238, it is determined if the caller has pressed the "1" key. If it is determined in step 238 that the caller has pressed the "1" key, the procedure continues to step 240. At step 240, the audio to-do list is converted to a text to-do list. In an example embodiment, the conversion of the audio to-do list to a text to-do list is performed using an audio to text conversion procedure as is known in the art.

From step 240, the procedure continues to step 242 in which the text to-do list is sent to the printer device 135 and printed using the printer device 135 to produce a hardcopy of the text to-do list. In step 242, the procedure 200 returns to step 236. If in step 238 it is determined that the caller has not pressed the "1" key, the procedure 200 continues to step 244. In step 244, it is determined if the caller has pressed the "2" key. If the caller has pressed the "2" key, the procedure 200 continues to step 246. At step 246, the audio to-do list is converted to a text to-do list and the procedure 200 continues to step 248. In step 248, the text to-do list is converted to individual to-do list items. The converting of the text to-do list to individual to-do list items includes detecting a separation between one to-do list item and another. The conversion of the text to-do list into text to-do list items further includes determining any day, date, and/or time associated with each to-do list item. In step 250, the individual to-do list items are sent to the computing device 140 and are added to the software calendar application executed by and associated with the computing device 140. At a later time, a caller may view and/or modify the to-do list items recorded by the DTAD 120 on the GUI of the display 150 using the software calendar application. From step 250, the procedure 200 returns to step 236. If at step 244, it is determined that the caller has not pressed the "2" key, the procedure continues to step 252. In step 252, it is determined whether the caller has pressed the "#" key. If the caller has not pressed the "#" key, the procedure returns to step 236. If the caller has pressed the "#" key, the procedure continues to step 216 in which the call is disconnected and the procedure ends in step 255.

If in step 208 it is determined that the caller has not entered the passcode within the predetermined time period, the procedure continues to step 254. In step 254, the caller is prompted to record a voicemail message. In step 256, the DTAD 120 records the voicemail message from the caller and stores the message in the memory 130. In step 258, the recorded voicemail message is played back to the caller by the DTAD 120. In step 260, the caller is prompted for approval of the recorded voicemail message. In an example embodiment, the caller is prompted to approve the voicemail message by pressing the "1" key and to not approve the voicemail message by pressing the "#" key. In step 262, it is determined if the caller has approved the voicemail message. If the caller has not approved the voicemail message, the procedure returns to step 254. If the caller has approved the voicemail message, the procedure continues to step 216 in which the call is disconnected and the procedure ends in step 255. In at least one embodiment, if the caller has not approved the voicemail message in step 262 before a predetermined time period, the procedure continues to step 216 and the call is disconnected and the procedure in step 255.

Figure 3:
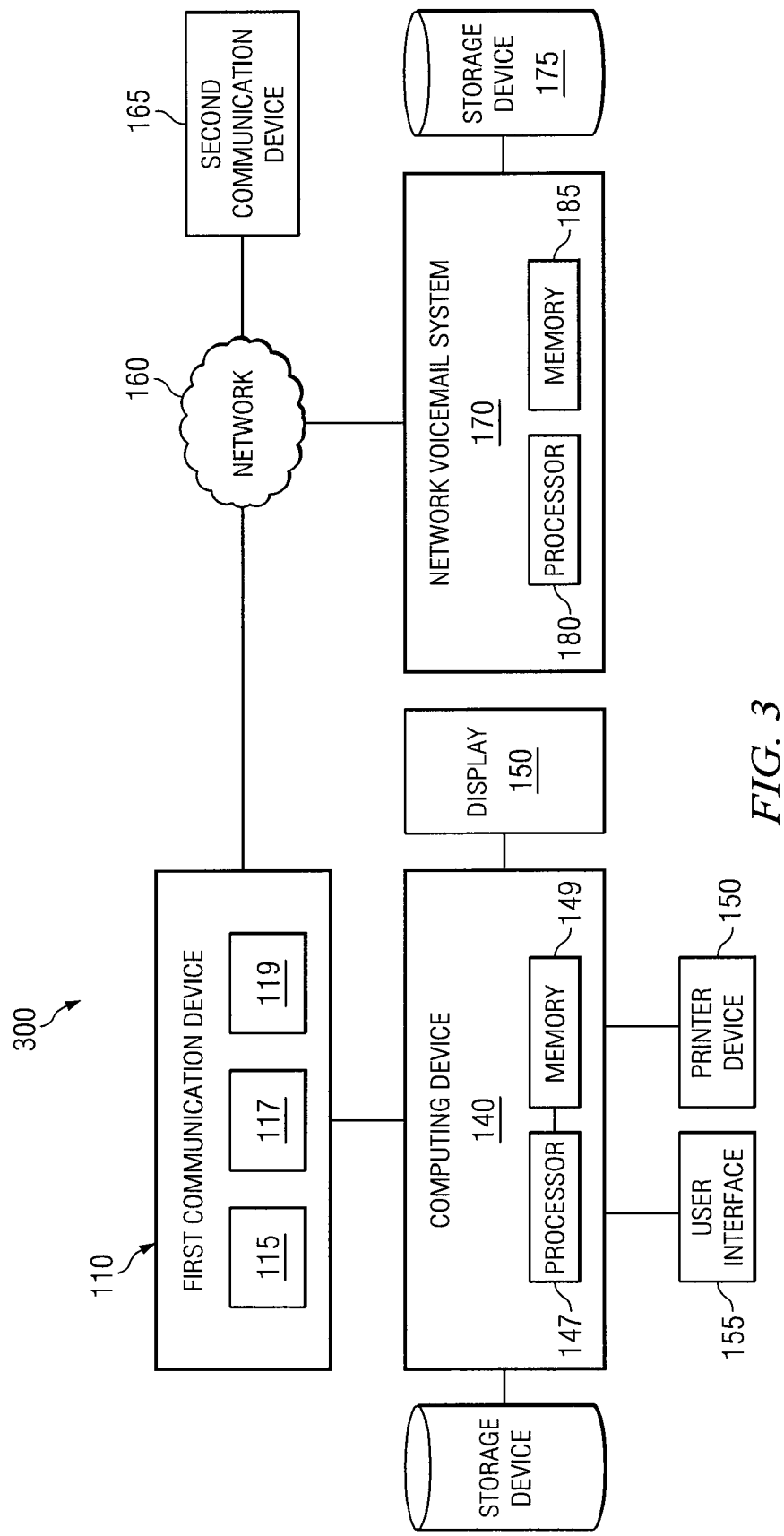
FIG. 3 is another embodiment of a system for recording an audio to-do list and adding to-do list items to a software calendar application.

FIG. 3 is another embodiment of a system 300 for recording an audio to-do list and adding to-do list items to a software calendar application. System 300 of FIG. 3 is similar to system 100 of FIG. 1, but includes a number of differences. The system 300 of FIG. 3 does not include a DTAD 120. Instead the computing device 140 is in communication with the first communication device 110 and the printer device 150. The system 300 of FIG. 3 further includes a network voicemail system 170 coupled to the network 160. The network voicemail system 170 includes a processor 180 and a memory 185. The memory 185 is configured to store computer instructions configured to cause the processor 180 to perform the various functions of the network voicemail system 170 described herein. A storage device 175 is further coupled to the network voicemail system 170. In the embodiment of FIG. 3, the network voicemail system 170 replaces the functionality of the DTAD 120 in the system 100 of the embodiment of FIG. 1. In the embodiment illustrated by FIG. 3, a DTAD 120 is not required to be installed at the customer premise location 107. Instead, the functionality of the DTAD 120 is provided by the network voicemail system 170. The storage device 175 is configured to store to-do lists and voicemails associated with the CPE 105. The network voicemail system 170 is provided by a service provider in at least one embodiment.

In an example operation of the system 300 of FIG. 3, a caller using the second communication device 165 records a to-do list using the network voicemail system 170. The network voicemail system 170 stores the to-do list on the storage device 175. The network voicemail system 170 may then convert the audio to-do list into a text to-do list and send the text to-do list to the first communication device 110. The first communication device 110 may then send the text to-do list to the computing device 140, and the computing device 140 may then send the text to-do list to the printer device 150 for producing a hardcopy of the text to-do list. In various embodiments, the network voicemail system 170 may convert the audio to-do list into a text to-do list. The network voicemail system 170 may then convert the text to-do list into individual text to-do list items, and send the individual to-do list items to the computing device 140 via network 160 and the first communication device 110. The individual text to-do list items may then be added to the software calendar application by the computing device 140.

In still other embodiments, the conversion of the audio to-do list into a text to-do list may be performed by the network voicemail system 170, and the network voice mail system sends the text to-do list to the computing device 140. The computing device 140 may then convert the text to-do list into one or more individual to-do list items and add the to-do list items to the software calendar application.

FIG. 4 is an embodiment of a graphical user interface (GUI) 400 for displaying and modifying to-do list items associated with a software calendar application. The GUI 400 includes a time area 402 indicating times of a day. The GUI 400 also includes a date/day area 404 displaying one or more dates and/or days of the week. The GUI 400 further includes a daily view option 406a, which, when selected by a user, is configured to cause the GUI 400 to display to-do list items associated with the current day, a weekly option 406b configured to cause the GUI 400 to display to-do list items associated with a selected week, and a monthly option 406c configured to cause the GUI 400 to show to-do list items associated with an entire selected month.

In an example operation of the GUI 400, a caller using a second communication device 165 records a to-do list using the DTAD 120. The to-do list contains the following audio information, "call John on Tuesday at 2:00 pm, pick up laundry on Monday, teleconference on June 5 at 3:00 pm, file report Wednesday at 10:00 am, attend birthday party on Saturday, June 5 at 1:00 pm." The audio to-do list is then converted to a text to-do list. The text to-do list is then converted to individual to-do list items. The "call John on Tuesday at 2:00 pm" item is added to section 408 of the GUI 400 indicating that the to-do list item is to be performed on Tuesday, June 3 at 2:00 pm. The "pick up laundry on Monday" item is placed at location 410 on the GUI 400 indicating that laundry should be picked up on Monday, June 2. Since no specific time period was indicated by the caller recording the audio to-do list, the to-do list item is placed at the beginning of the specified day with an indicator 411 indicating that it is a to-do list item that is to be performed at some time during the indicated day. The "teleconference on June 5 at 3:00 pm" to-do list item is added at location 412 in the GUI 400 indicating that the to-do list item is to be performed on June 5 at 3:00 pm. The "file report on Wednesday at 10:00 am" to-do list item is placed at location 414 in the GUI 400 indicating that the report to-do list item is to be performed on Wednesday, June 4 at 10:00 am. The "Saturday, June 5 at 1:00 pm attend birthday party" to-do list item is inserted at location 416 in the GUI 400 indicating that the to-do list item is to be performed on Saturday, June 5 at 1:00 pm. A set format for entering to-do list items may be utilized or natural language, free-form transcription may be utilized.

In various embodiments, a user of the computing device 140 may use the GUI 400 to modify one or more of the to-do list items displayed by the GUI 400. For example, the user may modify the time, date, and/or description of a particular to-do list item via the GUI 400. In addition, the user may delete a particular to-do list item via the GUI 400.

Figure 5:
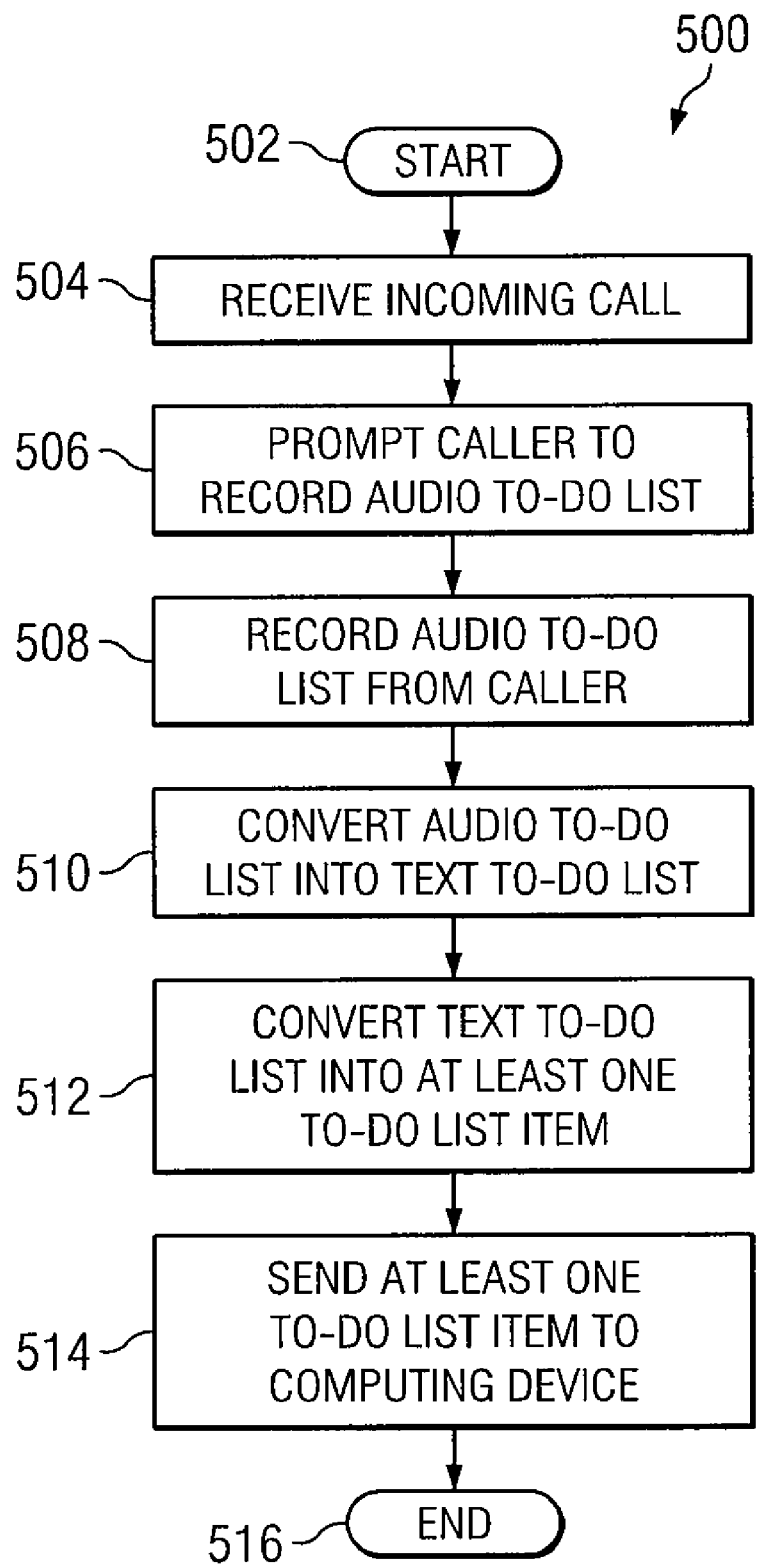
FIG. 5 is a flow chart of an illustrative process for recording an audio to-do list.

FIG. 5 is a flow chart of an illustrative process 500 for recording an audio to-do list. The process 500 starts in a step 502. Step 504 includes receiving an incoming call by the first communication device 110 from a caller using the second communication device 165. In at least one embodiment, the first communication device 110 is located at a customer premise location. Step 506 includes prompting the caller to record an audio to-do list. Step 508 includes recording an audio to-do list from the caller. Step 510 includes converting the audio to-do list into a text to-do list. Step 512 includes converting the text to-do list into at least one to-do list item. Step 512 includes sending the at least one to-do list item to the computing device 140 to be utilized by an application. In at least one embodiment, the at least one to-do list item is added to a software calendar application associated with the computing device 140. In step 516 the process 500 ends.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate or transport the program for use by or in connection with the instruction execution system, apparatus or device. In various embodiments, the customer premise equipment 105 includes one or more processors operable to execute computer executable instructions from a computer-usable or computer-readable medium to perform the various capabilities of the customer premise equipment 105 described herein.

The computer-usable or computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for recording a to-do list and adding to-do list items to a software calendar application, comprising:
   receiving an incoming call to a first communication device;
   answering the incoming call using a digital telephone answering device (DTAD), the DTAD being associated with the first communication device;
   prompting a caller to record an audio to-do list by the DTAD;
   recording the audio to-do list from the caller by the DTAD;
   converting the audio to-do list into a text to-do list by the DTAD prior to sending the text to-do list to a computing device;
   sending, by the DTAD, at least one to-do list item from the text to-do list to the computing device; and
   adding the at least one to-do list item to the software calendar application associated with the computing device, wherein the software calendar application is configured to provide reminders for performing the at least one to-do list item.

2. The method of claim 1, further comprising:
   providing a graphical user interface for displaying one or more of the to-do list items.

3. The method of claim 1, further comprising:
   providing a graphical user interface for modifying one or more of the to-do list items.

4. The method of claim 1, further comprising:
   sending the text to-do list to a printer device; and
   producing a hardcopy of the text to-do list using the printer device.

5. The method of claim 1, wherein prompting the caller to record an audio to-do list further comprises:
prompting the caller to enter a predetermined passcode; and
prompting the caller to record the audio to-do list if the caller enters the predetermined passcode within a predetermine time period.

6. The method of claim 1, further comprising:
playing back the audio to-do list to the caller; and
prompting the caller to approve the audio to-do list.

7. The method of claim 6, further comprising:
prompting the caller to re-record the audio to-do list if the caller does not approve the audio to-do list.

8. The method of claim 1, further comprising:
prompting the caller to select recording of either of the audio to-do list or a voicemail message.

9. The method of claim 1, wherein the at least one to-do list item includes information related to one or more of a date, time, and description of a task.

10. A digital telephone answering device (DTAD) for recording a to-do list and adding to-do list items to a software calendar application, comprising:
at least one processor, the at least one processor configured to:
receive an incoming call by the DTAD from a caller using a communication device, the DTAD being located at a customer premise location; prompt the caller to record an audio to-do list by the DTAD; record an audio to-do list from the caller by the DTAD; convert the audio to-do list into a text to-do list by the DTAD prior to sending the text to-do list to a computing device; convert the text to-do list into at least one to-do list item the DTAD; and
send, by the DTAD, at least one to-do list item to a computing device to be utilized by an application, wherein the at least one computing device is configured to automatically add the at least one to-do list item to the software calendar application associated with the computing device in response to receiving the at least one to-do list item from the DTAD and wherein the software calendar application is configured to provide reminders for performing the at least one to-do list item.

11. The DTAD of claim 10, wherein the at least one computing device is further configured to provide a graphical user interface for displaying one or more of the to-do list items.

12. The DTAD of claim 10, wherein the at least one computing device is further configured to provide a graphical user interface for modifying one or more of the to-do list items.

13. The DTAD of claim 10, wherein the at least one processor is further configured to:
send the text to-do list to a printer device; and
produce a hardcopy of the text to-do list using the printer device.

14. The DTAD of claim 10, wherein the at least one processor is further configured to:
prompt the caller to enter a predetermined passcode; and
prompt the caller to record the audio to-do list if the caller enters the predetermined passcode within a predetermined time period.

15. The DTAD of claim 10, wherein the at least one processor is further configured to:
play back the audio to-do list to the caller; and
prompt the caller to approve the audio to-do list.

16. The DTAD of claim 15, wherein the at least one processor is further configured to:
prompt the caller to re-record the audio to-do list if the caller does not approve the audio to-do list.

17. The DTAD of claim 10, wherein the at least one processor is further configured to:
prompt the caller to select recording of either of the audio to-do list or a voicemail message.

18. The DTAD of claim 10, wherein the at least one to-do list item includes information related to one or more of a date, a time, and a description of a task.

* * * * *